July 12, 1927.

W. HOLDSWORTH

GILL SCREW

Filed Sept. 3, 1925

1,635,181

Inventor:
Willie Holdsworth
By
Munington and White
Attorneys.

Patented July 12, 1927.

1,635,181

UNITED STATES PATENT OFFICE.

WILLIE HOLDSWORTH, OF PROVIDENCE, RHODE ISLAND.

GILL SCREW.

Application filed September 3, 1925. Serial No. 54,278.

This invention relates to gill-drawing frames and consists in improvements in the means for attaching the faller-cams to the gill-screws.

The principal object of the invention is to provide a simple and efficient means for attaching the faller-cam to the end of the screw while keying it in definite relation to the threads thereof, whereby the cam-faces will assume the correct relation with respect to the ends of the threads to act properly to transfer the faller-bars from one screw to another.

A particular object of the present invention is to provide an attaching means for the faller-cam which, while strong and efficient for the purpose described, occupies a minimum space at the end of the screw and makes for a generally more compact and self-contained structure.

Further objects of the improvement are set forth in the following specification which describes a preferred embodiment of the invention as illustrated in the accompanying drawings. In the drawings.

Figure 1:
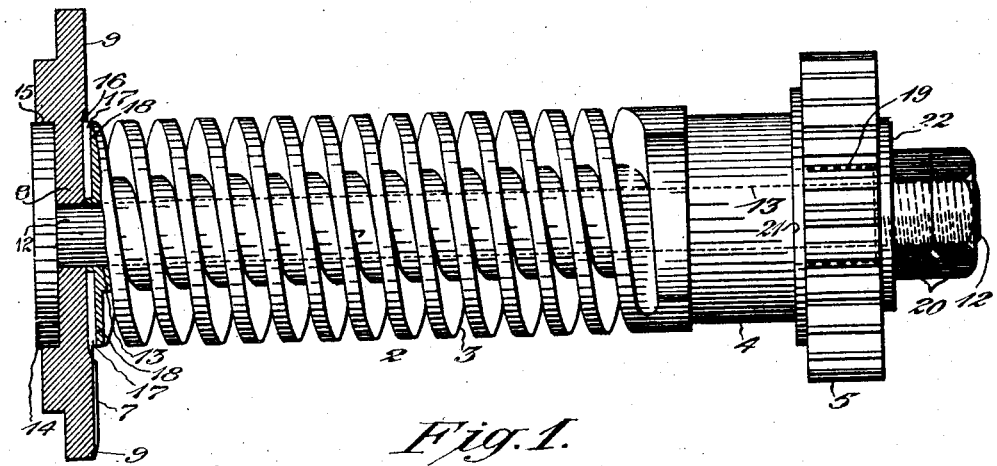
Fig. 1 is a side view of the top-screw of a gill-drawing frame showing the faller-cam at its end and the improved fastening means for securing it in place thereon.

Referring to the drawings, Fig. 1 illustrates the top-screw of a French or Swiss type of gill-drawing frame. In this style of machine the screw is relatively short and arranged in a contracted space so that the usual nut or collar generally provided for fastening the cam on a stud at the end of the screw cannot be employed. That is to say, the rollers which feed the fibers through the gill-drawing frame are arranged so close to the end of the screw that very little space is available therebeyond, the feed-rollers being located to just clear the cam. In this type of machine it has heretofore been necessary to employ a top-screw having the cam formed as a part thereof, that is, made integral with the screw itself to save space. This requires that the cams be shaped and finished by hand which necessarily increases the cost of manufacture of the screw very considerably over that of machine-made screws. Furthermore, where the cam is made integral with the screw the breaking or damaging of the came necessitates replacement of the whole screw, which is very expensive as compared to machine-made screws in which the cams are made separate and attached in place to render them interchangeable for repair or replacement.

In my U. S. Letters Patent No. 1,540,396, granted June 2, 1925, there is illustrated a gill-screw having its faller-cam attached and keyed in place by an improved means forming the subject-matter of the invention. In this invention the faller-cam is carried on an axial stud projecting from the end of the screw, with a collar or nut screwed onto the stud to hold the cam in place. Keys on the arms of the cam engage splines or slots in the end of the screw to lock the cam rotatively therewith and the circular nut or collar which holds the cam in place serves as a trunnion for the screw, being journaled in a bearing in the end-plate of the gill-drawing frame.

In the French type of machine there is no end-plate or outer bearing for the top-screw and no space available for an end nut or collar for fastening the cam in place at the end of the screw. Therefore, in order to render the cam detachable for repair or replacement a different form of attaching means must be provided for holding the cam in place on the screw. To this end I have devised a particularly simple and compact fastening means for the cam which is constructed and arranged as next described.

In the drawings, 2 designates the top-screw of the gill-drawing frame which is provided with exterior threads 3, usually of double pitch, for traversing the gill-bars or fallers which act to comb the fibers passing through the machine. As well known to those versed in the art, the faller-bars slide on horizontal guides or saddles with their ends engaging the threads of oppositely arranged screws to cause them to be traversed therefrom. As the fallers reach the end of one pair of screws, for instance the top-screws, they pass out of the thread-grooves and are acted upon by the cams to carry them down into the threads of the bottom-screws which rotate in the opposite direction. As the bars reach the ends of the bottom-screws they are again transferred to the top-screws through the action of the bottom-cams, and in this way the fallers are traveled back and forth in opposite directions with a continuous movement throughout the operation of the machine.

At the inner end of the top-screw 2 is an enlarged hub or boss 4 by means of which it is journaled in its bearing in the gill-drawing frame, not herein shown, and beyond the hub is a spur-gear or pinion 5 which connects the top-screw to be rotated from its cooperating bottom-screw.

Figures 2, 3, 4:
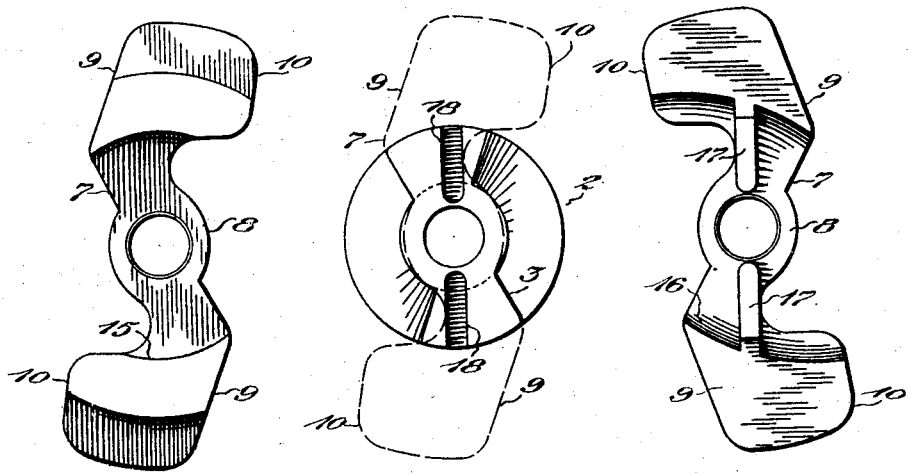
Fig. 2 is an end view of the gill-screw, showing the splines or slots for receiving the keys on the cam and illustrating the relation of the cam to the screw.
Fig. 3 is an end or face view of the faller-cam.
Fig. 4 is an opposite face view of the faller-cam, showing the integral keys on its arms.
Figure 5:
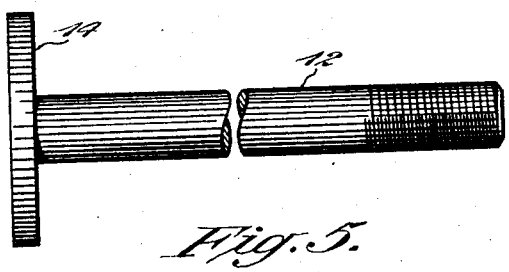
Fig. 5 is a view of the fastening bolt which extends axially of the screw.

At the outer end of the top-screw 2 is the faller-cam 7 which may be of conventional form having a hub 8 with radial arms 9 extending therefrom and terminating in the cam faces 10. For supporting the cam 7 at the end of the screw I provide an axial rod or bolt 12, shown in detail in Fig. 5. The bolt 12 is fitted to an axial bore 13 extending the length of the top-screw 2, and at its outer end is a relatively thin circular head or disk 14. The disk or head 14 is received within a circular recess 15 milled on the outer face of the cam 7, see Figs. 1 and 3. The inner face of the cam which abuts the end of the top-screw 2 is milled away at 16 to form relatively narrow keys 17 similar in construction and for the same purpose as set forth in my prior patent above referred to. That is to say, these keys 17 are received in radial slots or splines 18 cut into the end of the threads on the top-screw 2, thereby providing a rigid and secure means for keying or locking the cam 7 rotatively with the screw.

The cam 7 is set against the end of the top-screw 2 with its keys 17 engaging the slots 18, and the bolt 12 is then inserted through the hole in the hub 8 of the cam and through the bore 13 in the screw 2. The head or disk 14 on the end of the bolt 12 is thus caused to abut the outer face of the arms 9 of the cam 7, being received within the milled recess 15, and the opposite threaded end of the bolt projects beyond the inner end of the screw 2 to adapt it to receive suitable nuts 20.

The gear 5 is carried on a reduced portion 19 of the screw 2 with its hub abutting a shoulder 21 on the screw. Abutting the outer end of the gear 5 is a collar or washer 22 against which one of the nuts 20 is tightened, the other nut serving as a lock to prevent it from unscrewing. When the nuts 20 are set up against the washer 22 in this manner the bolt 12 will be drawn through the bore in the screw 2 to seat its head 14 snugly against the outer face of the cam 7, thus clamping the cam against the end of the screw to hold its keys 17 in the splines 18. The head 14 on the bolt 12 thus serves to firmly secure the cam in place at the end of the screw while holding its keys in engagement with the splines to lock the cam rotatively of the screw. At the same time the nuts 20 hold the gear 5 in place at the opposite end of the screw and the whole provides an extremely simple and compact mechanical construction which serves adequately for the purpose specified. The head or disk 14 projects only a slight distance beyond the outer face of the cam 7 so that it does not interfere with the drawing-rollers or other parts of the machine. The extended radius of the head 14 adapts it to serve as a stiffening and strengthening element for the cam to reinforce it against the severe strains and stresses to which it is subjected during the normal operation of the machine.

Through this compact arrangement of the fastening means I am enabled to provide a top-screw having a detachable cam which takes up practically no more space than that of a cam made integral with the screw. At the same time, the cam is substantially as strong as if formed as a part of the screw and is locked securely with the screw and reinforced by the end disk or head to prevent fracture through its weakest parts. In this way the advantages of detachable and interchangeable cams are applicable to machines of the type in which heretofore only screws having integral cams could be used.

While I have herein described and illustrated a preferred embodiment of the invention, it is obvious that various modifications may be made in the form and structure of the parts of the device without departing from the spirit or scope of the invention, therefore without limiting myself in this respect, I claim:

1. A gill-screw for gill-drawing frames provided with an axial bore extending throughout its length, a cam at the end of the screw, and a bolt extending through the bore in the screw and having means at its projecting end for securing it to hold the cam in place on the screw.

2. A gill-screw for gill-drawing frames provided with an axial bore extending throughout its length, a bolt extending through the bore, a cam abutting the end of the screw, means for keying the cam rotatively with the screw, and means at the projecting end of the bolt for drawing it through the bore to clamp the cam in place at the end of the screw.

3. A gill-screw provided with an axial bore, a cam abutting the end of the screw, a bolt extending through the cam and the bore in the screw and provided with means engaging the cam to hold it in place on the screw, and a nut at the opposite end of the bolt for tightening the cam against the screw.

4. A gill-screw for gill-drawing frames provided with an axial bore, a detachable cam at one end of the screw, a detachable gear at the opposite end of the screw, a bolt extending through the bore in the screw, and means at the ends of the bolt for securing the cam and gear in place on the screw.

5. A gill-screw provided with an axial bore and a cross-slot in its end, a cam abutting the end of the screw and having means engaging the slot therein to key the cam rotatively therewith, a bolt extending through the cam and the bore in the screw, and a nut at the opposite end of the bolt for drawing it through the bore to clamp the cam in place on the screw.

6. The combination with a gill-screw having an axial bore extending throughout its length, of a cam abutting the end of the screw and having a recess in its outer face, a threaded bolt extending through the bore in the screw and provided with a relatively thin head received within the recess in the face of the cam, and means at the projecting end of the bolt to draw it through the bore to tighten its head against the cam to secure the latter in place on the screw.

7. A gill-screw provided with an axial bore and a reduced portion at one end, a gear on the reduced portion of the screw, a cam abutting the opposite end of the screw, a bolt extending through the cam and the bore in the screw, and a nut on the bolt for clamping the cam against one end of the screw and securing the gear in place at its opposite end.

In testimony whereof I affix my signature.

WILLIE HOLDSWORTH.